US011920757B2

(12) United States Patent
Wang et al.

(10) Patent No.: US 11,920,757 B2
(45) Date of Patent: Mar. 5, 2024

(54) LAMP FOR VEHICLE AND VEHICLE

(71) Applicant: VALEO VISION, Bobigny (FR)

(72) Inventors: Zhujun Wang, Bobigny (FR); Xian Zhang, Bobigny (FR); Kang Ye, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/774,506

(22) PCT Filed: Nov. 6, 2020

(86) PCT No.: PCT/EP2020/081257
§ 371 (c)(1),
(2) Date: May 5, 2022

(87) PCT Pub. No.: WO2021/094212
PCT Pub. Date: May 20, 2021

(65) Prior Publication Data

US 2022/0373155 A1 Nov. 24, 2022

(30) Foreign Application Priority Data

Nov. 14, 2019 (CN) ........................ 201921972990.X

(51) Int. Cl.
*F21S 43/20* (2018.01)

(52) U.S. Cl.
CPC .................................... *F21S 43/26* (2018.01)

(58) Field of Classification Search
CPC ....................................................... F21S 43/26
See application file for complete search history.

(56) References Cited

U.S. PATENT DOCUMENTS

2017/0028905 A1 2/2017 Irgang et al.
2018/0058656 A1* 3/2018 Naron .................. F21S 43/145
(Continued)

FOREIGN PATENT DOCUMENTS

EP 2489550 A2 8/2012
EP 2735476 A2 5/2014
(Continued)

OTHER PUBLICATIONS

European Patent Office, International Search Report and Written Opinion of corresponding International Application No. PCT/EP2020/081257, dated Jan. 22, 2021.

*Primary Examiner* — Christopher E Dunay
(74) *Attorney, Agent, or Firm* — Valeo Vision

(57) ABSTRACT

The present invention relates to a lamp for a vehicle and a vehicle. The lamp includes a housing and a light source arranged in the housing, an opening of the housing being divisible into one or more light emitting regions to correspondingly realize a predetermined light function, wherein the at least one light emitting region is provided with a light distribution element for the light source, the light distribution element having a first light distribution portion and a second light distribution portion, the first light distribution portion being configured to cause light of the light source to leave the light emitting region within a first angular range, and the second light distribution portion being configured to cause light of the light source to leave the light emitting region within a second angular range that is different from the first angular range.

11 Claims, 2 Drawing Sheets

(56) References Cited

U.S. PATENT DOCUMENTS

| | | | | |
|---|---|---|---|---|
| 2019/0309919 | A1* | 10/2019 | Tanoue | F21S 41/32 |
| 2022/0136671 | A1* | 5/2022 | Zhu | F21S 41/143<br>362/520 |
| 2022/0170606 | A1* | 6/2022 | Potter | F21S 41/28 |
| 2022/0324374 | A1* | 10/2022 | Zhu | F21S 41/60 |
| 2023/0028522 | A1* | 1/2023 | Heitjohann | F21S 43/40 |

FOREIGN PATENT DOCUMENTS

| | | | |
|---|---|---|---|
| EP | 3553370 | A1 | 10/2019 |
| JP | 2018041711 | A | 3/2018 |
| WO | 2016009733 | A1 | 1/2016 |

* cited by examiner

LAMP FOR VEHICLE AND VEHICLE

CROSS-REFERENCE TO RELATED APPLICATIONS

This application is filed under 35 U.S.C. § 371 U.S. National Phase of International Application No. PCT/EP2020/081257 filed Nov. 6, 2020 (published as WO2021094212), which claims priority benefit to Chinese application No. 201921972999.X filed on Nov. 14, 2019, the disclosures of which are herein incorporated by reference in their entirety.

TECHNICAL FIELD

The present invention relates to a lamp for a vehicle and a vehicle.

BACKGROUND OF THE INVENTION

In a lamp especially for use in a vehicle, the relevant statutory distribution must be achieved for various functions, for example a turn indicator lamp function, a brake lamp function or a back-up lamp in a tail lamp. For instance, in the case of a rear turn indicator lamp mounted at the rear of the vehicle, according to National Standard GB17509, the vertical angle of light distribution relative to a horizontal plane shall be in the range of ±15°, while the horizontal angle relative to a reference axis and the direction of forward travel of the vehicle shall be in the range of −45° to +80°.

BRIEF SUMMARY OF THE INVENTION

An object of the present invention is to propose a lamp for a vehicle that can economically realize at least one light function achieving a statutory distribution.

The abovementioned object is achieved in the following way: a proposed lamp for a vehicle includes a housing and a light source arranged in the housing, an opening of the housing being divisible into one or more light emitting regions to correspondingly realize a predetermined light function, wherein the at least one light emitting region is provided with a light distribution element for the light source, the light distribution element having a first light distribution portion and a second light distribution portion, the first light distribution portion being configured to cause light of the light source to leave the light emitting region within a first angular range, and the second light distribution portion being configured to cause light of the light source to leave the light emitting region within a second angular range that is different from the first angular range.

Here, the "light emitting region" can be understood to be a region, reserved for the corresponding light function, of a cover that closes the opening of the housing.

As a result of dividing the light distribution element for the light source into different light distribution portions, the corresponding light distribution portions are responsible for determined sub-ranges in a corresponding light distribution angular range required by regulations. This facilitates structural flexibility and simpler design, and enables better matching to specific lamp modelling, especially in cases where the installation depth of the light source in the lamp is very deep.

Here, the first and second light distribution portion can be regarded as parts having a light guiding function, which guide light into a desired angular range.

In one embodiment, the light distribution element is L-shaped. The first and second light distribution portion respectively form two corresponding legs. For example, the first light distribution portion is mainly responsible for light distribution in the range of −45° to +45°, and the second light distribution portion is responsible for an angular distribution in the range of +45° to +80°.

In one embodiment, the first light distribution portion transitions into the second light distribution portion via a bridge portion, wherein two opposite surfaces of the bridge portion are totally reflecting surfaces. This facilitates the guiding of at least a portion of light emitted by the light source into the corresponding light distribution portion, to improve the light utilization rate.

In one embodiment, one of the first and second light distribution portion is provided with a first light regulation structure facing the light source. Preferably, the first light regulation structure takes the form of a collimator, wherein the quantity of the collimator is equal to that of the light source. Since the light emitted by the light source is generally a conical light beam, the light regulation structure is provided for the light source so as to adjust the light emitted by the light source to form parallel light. This facilitates subsequent processing of the light, and simplifies the design of other optical surfaces. The light source can be a light emitting diode, and the quantity thereof can be determined according to need. In the case where multiple light sources are provided, one light regulation structure in the form of a collimator can be specially allocated to each light source. Of course, multiple light sources can also share one light regulation structure.

In one embodiment, a second light regulation structure is provided on at least one surface of the other of the first and second light distribution portion. As an example, the second light regulation structure can be disposed on a side opposite to a side where light leaves the other light distribution portion, and is configured to destroy the conditions for total reflection of light propagated in the other light distribution portion, such that light can exit in a desired angular range.

In one embodiment, a third light regulation structure is provided opposite to the first light regulation structure. This is further beneficial for the uniformity of light exit and the relevant light exit angle requirements.

Preferably, the light distribution element is formed in one piece. For example, it is made from polycarbonate, polymethyl methacrylate, etc. by injection molding.

In one embodiment, the lamp is a front or tail lamp. For this purpose, the color of the corresponding light source is selected according to the specific function of the tail lamp, e.g. white, red or amber.

The present invention also proposes a vehicle, having the lamp described above.

BRIEF DESCRIPTION OF THE DRAWINGS

The present invention is expounded further below with the aid of the drawings. In the drawings.

DETAILED DESCRIPTION OF THE INVENTION

Embodiments of the present invention are explained demonstratively below. As those skilled in the art should realize, the embodiments explained can be modified in various ways without departing from the concept of the present invention. Thus, the drawings and the description are in essence demonstrative and non-limiting. In the following text, identical drawing reference labels generally indicate functionally identical or similar elements.

Figure 1:
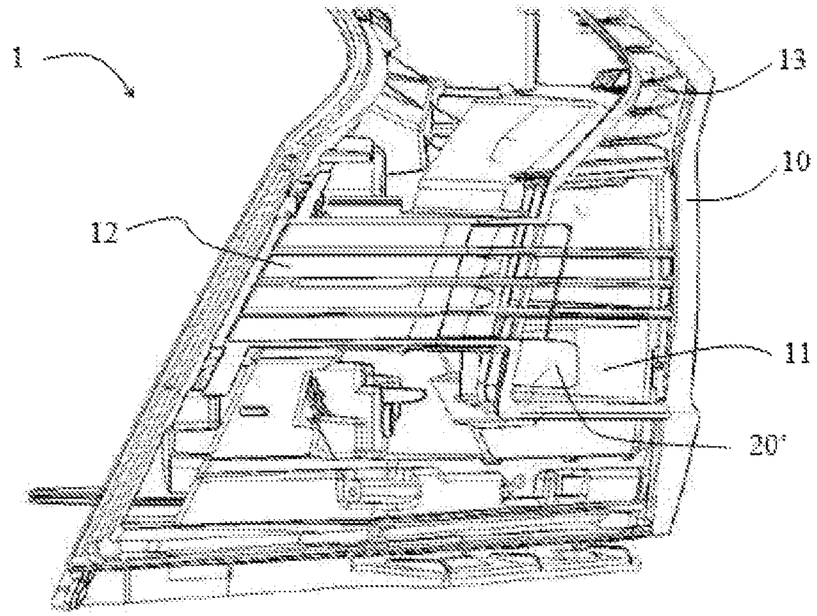
FIG. 1 shows schematically a lamp for a vehicle.

FIG. 1 shows a lamp 1 for a vehicle, for example a tail lamp, including a housing 10. An accommodating space of the housing is divided into multiple regions for corresponding light functions. As can be seen from FIG. 1, a space enclosed by the housing 10 is divided into a first region 11, a second region 12 and a third region 13, which are correspondingly used to accommodate a turn indicator lamp, a position lamp and a brake lamp. A flat light distribution element 20' accommodated in the first region 11 is shown here, which is used to guide and distribute light from a light source. However, in the case where a region allocated to a corresponding light function has a very deep net depth and a very narrow width, it is very difficult for the light distribution of light from the light source finally leaving the housing to meet the requirements of the regulations, especially with regard to the horizontal angle relative to the reference axis and the direction of forward travel of the vehicle.

Figure 2:
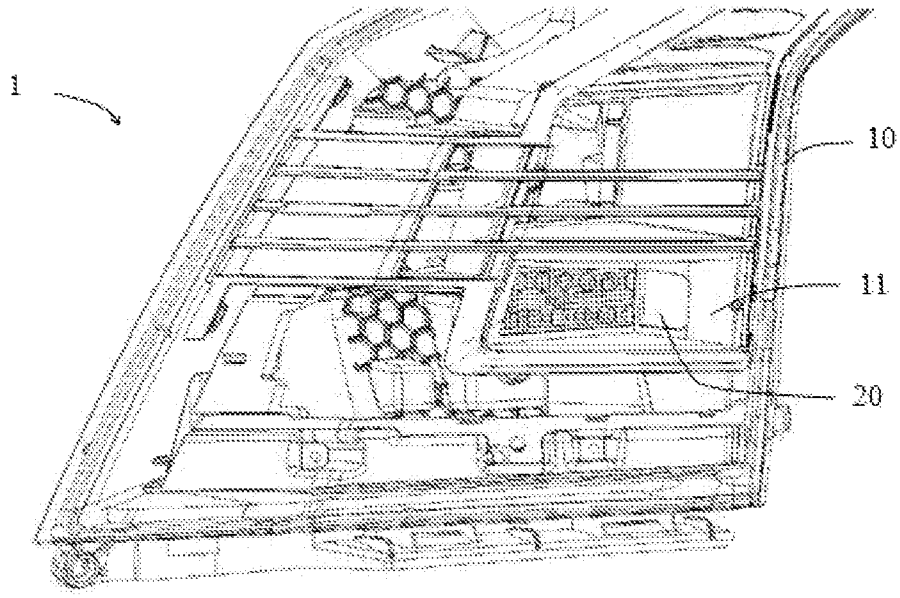
FIG. 2 shows schematically a lamp for a vehicle according to the present invention.

FIG. 2 shows a lamp of a vehicle according to the present invention. The structure thereof is similar to that of the lamp in FIG. 1, but differs due to the light distribution element 20, which has a different structure from that of the light distribution element 20' in FIG. 1. The light distribution element 20 is described in detail below with the aid of FIGS. 3-5.

The light distribution element 20 has a first light distribution portion 21 and a second light distribution portion 22, wherein the first light distribution portion 21 transitions into the second light distribution portion 22 via a bridge portion 23, i.e. the bridge portion 23 is disposed between the first light distribution portion 21 and the second light distribution portion 22.

Figure 3:
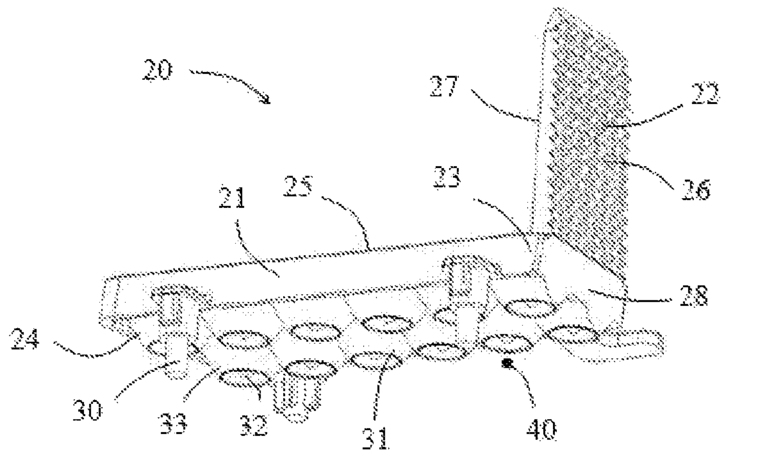
FIG. 3 shows a perspective view of a light distribution element for the lamp in FIG. 2.

As can be seen from FIG. 3, the light distribution element 20 is L-shaped, so that the first light distribution portion 21 and second light distribution portion 22 respectively form corresponding legs, and the bridge portion 23 lies at the corner.

The first light distribution portion 21 and second light distribution portion 22 can both be in the form of plates. The sizes thereof can be matched according to the size of the light exit surface that needs to be illuminated. To facilitate description, a side of the light distribution element 20 where light exits is defined as an inner side, and a side which is opposite to the inner side is defined as an outer side.

The light distribution element 20 has a positioning part 30, to enable the light distribution element 20 to occupy the correct position relative to the housing and the light source. In the example shown, the positioning part 30 is a positioning pin. The positioning part 30 can be arranged at a side of the light distribution element 20. Alternatively, in an example that is not shown, the positioning part can also take the form of a positioning hole, or a combination of a positioning pin and a positioning hole. For this purpose, supports of the housing and light source have correspondingly mating positioning parts, e.g. holes.

The first light distribution portion 21 is provided with first light regulation structures 31 on a surface 24 at the outer side facing the light sources 40, to receive and adjust light from the light sources.

In the example shown, the first light regulation structures take the form of an array. A single light regulation structure is constructed as a collimator, which adjusts a conical light beam emitted by the light source to form a parallel light beam. For this purpose, the first light regulation structure 31 has a middle protrusion 32 and an annular tooth part 33 surrounding the protrusion 32. The array arrangement of the first light regulation structures is the same as that of the light sources. Preferably, the direction of the optical axis of the first light regulation structure coincides with, and at least approximately coincides with, that of the light source.

The second light distribution portion 22 can also have second light regulation structures 26. In the example shown, the second light regulation structures 26 are disposed at the outer side, and constructed as strip-like teeth. The extension of each strip-like tooth lies transverse to that of the second light distribution portion 22 itself. In particular, a cross section of a tooth surface of each strip-like tooth 26 away from the first light distribution portion 21 can be a wave-shaped surface, as can be seen from FIG. 3. This further facilitates light mixing, so as to achieve a uniform light exit effect. Here, the conditions for total reflection of light in the second light distribution portion 22 are destroyed by the second light regulation structures 26, such that light can exit. This will be explained further below in conjunction with a light path diagram.

Preferably, the second light regulation structures 26 disposed at the second light distribution portion 22 and taking the form of strip-like teeth differ from each other geometrically. For example, the tooth surfaces of the strip-like teeth 26 away from the first light distribution portion 21 have different angles of inclination.

Figure 4:
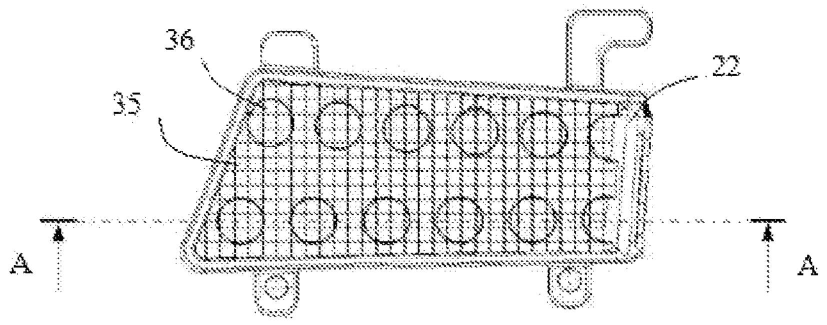
FIG. 4 shows a top view of the light distribution element.

Preferably, at least one of surfaces 25, 27 at the inner side of the first and second light distribution portion 21, 22 of the light distribution element 20 undergoes micro-structuring, e.g. is designed as a pillow-like array surface, a strip-like array surface or a leather-grained surface, so as to achieve further light mixing. As shown in FIG. 4, the surface 25 at the inner side of the first light distribution portion 21 has a pillow-like micro-array.

Figure 5:
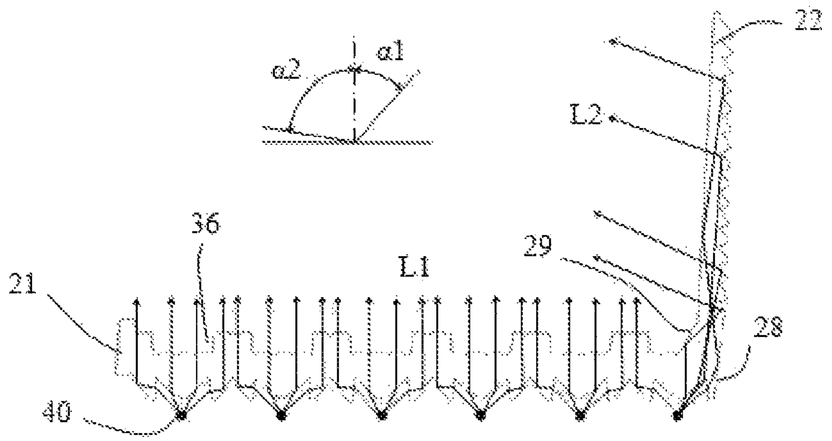
FIG. 5 shows a sectional view, taken along line A-A in FIG. 4, of the light distribution element.

An optical path diagram through the light distribution element 20 is shown in FIG. 5.

As can be seen, the light sources 40 are arranged to face towards the surface 24 at the outer side of the first light distribution portion 21. The collimators are provided at this surface, the number of collimators being equal to that of the light sources. The collimators transform light emitted by the light sources into parallel light beams. Here, the middle protrusion 32 of the collimator transforms received light into parallel light directly, whereas light arriving at the annular tooth part 33 enters the interior of the annular tooth part 33 with refraction and is then reflected by an outside periphery of the annular tooth part 33, thus being transformed to parallel light, which finally leaves the light distribution element through the surface 25. This portion of light beams is denoted by L1. It should be explained that in order to simplify the drawing, L1 is represented by parallel light beams only, but these light beams can also have other exit directions. For example, the angular distribution of L1 can be in the range of $-\alpha 2$ to $+\alpha 2$.

It can also be seen that at least a portion of light emitted by a light source close to the second light distribution portion 22 is coupled into the second light distribution portion 22. For this purpose, two opposite surfaces 28, 29 of the bridge portion 23 arranged between the first and second light distribution portion 21, 22 are totally reflecting surfaces, so as to guide at least a portion of the light emitted by the light source mentioned above into the second light distribution portion 22. Here, the surfaces 28, 29 can be mirror-finished, and preferably enclose a tapered part, i.e. a cross section of the bridge portion 23 gradually reduces towards the second light distribution portion 22.

Light coupled into the second light distribution portion 22 can be reflected by the light regulation structures 26 disposed on the side facing away from the light output side, and then exit through the surface 27. Here, the light regulation structures 26 can take the form of an array structure, e.g. a strip-like array, a pillow-like array or a combination thereof, thereby making the exit light more uniform. The angular distribution of a light beam L2 leaving the second light distribution portion 22 is for example in the range of $\alpha 1-\alpha 2$ to $+\alpha 1$.

It must be understood that the angular ranges of the light beams L1, L2 mentioned above are exemplary. They can be set according to actual requirements.

In order to present a desired effect, an additional structure can also be provided on the light distribution element. In the example shown, recesses 36 are provided on a light exit surface of the first light distribution portion 21 to match an overall visual effect of the lamp. In another embodiment, a third light regulation structure 35 can be provided opposite to the first light regulation structure 31. This is further beneficial for the uniformity of light exit and the relevant light exit angle requirements.

The light distribution element 20 can be plastic injection molded in one piece. For example, the light distribution element is made of polycarbonate, polymethyl methacrylate, etc. If necessary, the light distribution element 20 can be colored.

The light source allocated to the light distribution element is preferably a light emitting diode. The color of the light emitting diode is chosen according to requirements. For example, to realize a turn indicator lamp function, a light emitting diode that emits yellow light can be selected for use; to realize a brake lamp function, a light emitting diode that emits red light can be selected for use; to realize a reversing lamp function, a light emitting diode that emits white light can be selected for use.

After the light distribution element has been installed in the lamp for the vehicle, a light distribution structure can also be additionally provided in a region, allocated to the light distribution element, of a cover, i.e. an outer lens, that closes the housing of the lamp. This light distribution structure can be implemented in the same way as the light distribution structure mentioned above, e.g. be designed as a micro-array structure.

The present invention is not limited to the structure described above; various other variants could also be used. Although the present invention has already been described by means of a limited number of embodiments, those skilled in the art could, benefitting from this disclosure, design other embodiments which do not depart from the scope of protection of the present invention disclosed herein. Thus, the scope of protection of the present invention should only be limited by the appended claims.

What is claimed is:

1. A lamp for a vehicle, comprising a housing and a plurality of light sources arranged in the housing, an opening of the housing being divisible into one or more light emitting regions to correspondingly realize a predetermined light function, wherein the at least one light emitting region is provided with a light distribution element for the plurality of light sources, the light distribution element having a first light distribution portion and a second light distribution portion, the first light distribution portion being configured to cause light of the plurality of light sources to leave the light emitting region within a first angular range, and the second light distribution portion being configured to cause light of some of the plurality of light sources to leave the light emitting region within a second angular range that is different from the first angular range, with the first light distribution portion being a first surface of the light distribution element and the second light distribution portion being a second surface of the light distribution element, and the first surface being different than the second surface.

2. The lamp according to claim 1, wherein the light distribution element is L-shaped, and the first light distribution portion and second light distribution portion respectively form two corresponding legs.

3. The lamp according to claim 1, wherein the first light distribution portion transitions into the second light distribution portion via a bridge portion, wherein two opposite surfaces of the bridge portion are totally reflecting surfaces.

4. The lamp according to claim 1, wherein one of the first light distribution portion and second light distribution portion is provided with a first light regulation structure facing the plurality of light sources.

5. The lamp according to claim 4, wherein the first light regulation structure takes the form of a collimator, wherein the quantity of the collimator is equal to that of the plurality of light sources.

6. The lamp according to claim 4, wherein a second light regulation structure is provided on at least one surface of the other of the first light distribution portion and second light distribution portion.

7. The lamp according to claim 4, wherein a third light regulation structure is provided opposite to the first light regulation structure.

8. The lamp according to claim 1, wherein the light distribution element is formed in one piece.

9. The lamp according to claim 1, wherein the lamp is a front or tail lamp.

10. The lamp according to claim 1, wherein the light with the second angular range crosses over the light with the first angular range.

11. A vehicle, comprising a lamp, the lamp with a housing and a plurality of light sources arranged in the housing, an opening of the housing being divisible into one or more light emitting regions to correspondingly realize a predetermined light function, wherein the at least one light emitting region is provided with a light distribution element for the plurality of light sources, the light distribution element having a first light distribution portion and a second light distribution portion, the first light distribution portion being configured to cause light of the plurality of light sources to leave the light emitting region within a first angular range, and the second light distribution portion being configured to cause light of some of the plurality of light sources to leave the light emitting region within a second angular range that is different from the first angular range, with the first light distribution portion being a first surface of the light distribution element and the second light distribution portion being a second surface of the light distribution element, and the first surface being different than the second surface.

* * * * *